US008073912B2

(12) United States Patent
Kaplan

(10) Patent No.: US 8,073,912 B2
(45) Date of Patent: Dec. 6, 2011

(54) SENDER AUTHENTICATION FOR DIFFICULT TO CLASSIFY EMAIL

(76) Inventor: Michael Gregor Kaplan, New York, NY (US)

( * ) Notice: Subject to any disclaimer, the term of this patent is extended or adjusted under 35 U.S.C. 154(b) by 1179 days.

(21) Appl. No.: 11/827,754

(22) Filed: Jul. 13, 2007

(65) Prior Publication Data
US 2011/0271349 A1 Nov. 3, 2011

(51) Int. Cl.
G06F 15/16 (2006.01)
(52) U.S. Cl. ......... 709/206; 709/207
(58) Field of Classification Search ......... 709/206, 709/207; 707/952
See application file for complete search history.

(56) References Cited

U.S. PATENT DOCUMENTS

| | | | | |
|---|---|---|---|---|
| 6,112,227 | A * | 8/2000 | Heiner | 709/203 |
| 7,305,445 | B2 * | 12/2007 | Singh et al. | 709/206 |
| 2004/0015554 | A1 | 1/2004 | Wilson | |
| 2004/0148358 | A1 * | 7/2004 | Singh et al. | 709/207 |
| 2004/0249893 | A1 * | 12/2004 | Leeds | 709/206 |
| 2005/0015457 | A1 * | 1/2005 | Warasawa | 709/207 |
| 2006/0047766 | A1 * | 3/2006 | Spadea, III | 709/206 |
| 2007/0033258 | A1 * | 2/2007 | Vasilaky et al. | 709/206 |
| 2007/0117633 | A1 * | 5/2007 | Hamilton et al. | 463/42 |
| 2007/0117634 | A1 * | 5/2007 | Hamilton et al. | 463/42 |
| 2007/0208941 | A1 * | 9/2007 | Backer | 713/170 |
| 2007/0226804 | A1 * | 9/2007 | Somkiran et al. | 726/24 |
| 2008/0133676 | A1 * | 6/2008 | Choisser et al. | 709/206 |

* cited by examiner

Primary Examiner — Emmanuel L Moise
Assistant Examiner — Vitali Korobov
(74) Attorney, Agent, or Firm — Brenda Pomerance

(57) ABSTRACT

The portion of email traffic that cannot be definitively determined to be spam or definitively determined to be ham (non-spam) is processed by sending a bounceback email to the sender, requiring the sender to reply using a sub-address created by the bounceback generator. The type of bounceback email depends on whether the domain of the received email indicates that the sender is or is not likely to be a spammer. When the sender is not likely to be a spammer, the bounceback email includes a sub-address in computer readable form. When the sender is likely to be a spammer, the bounceback email includes a test that must be solved to yield the sub-address; preferably, the test is very difficult for a computer to solve but reasonably easy for a human to solve. When a reply email to the bounceback email ("reply bounceback") is received, the presence of the sub-address indicates that the sender is not a spammer, so the reply bounceback is determined to be ham and delivered to the destination mailbox. The bounceback can have the sub-address encoded in such a way that a human must be involved in decoding, which is appropriate for situations where the envelope sender domain of the original email is considered suspicious. The bounceback can have the sub-address presented in a computer readable format when the envelope sender domain of the original email is more trustworthy, if authenticated. Authentication information can be retained in a local private Sender Policy Framework (SPF) database, or shared in a centralized private SPF database.

22 Claims, 17 Drawing Sheets

---

From: receiver25@mailserver130.com
To: sender10@webmail15.com
Date: January 1, 2007 11:34:30 am
Subject: BOUNCEBACK This is an automated response. The message below that you sent was blocked as possible spam. If this is a legitimate message, please type the sub-address characters shown into the address field below, then click SEND. Please use this sub-address for all future mail to me. Thank you for resending.

receiver25^ [        ]    @mailserver130.com

[SEND]

- - - - -
ORIGINAL MESSAGE

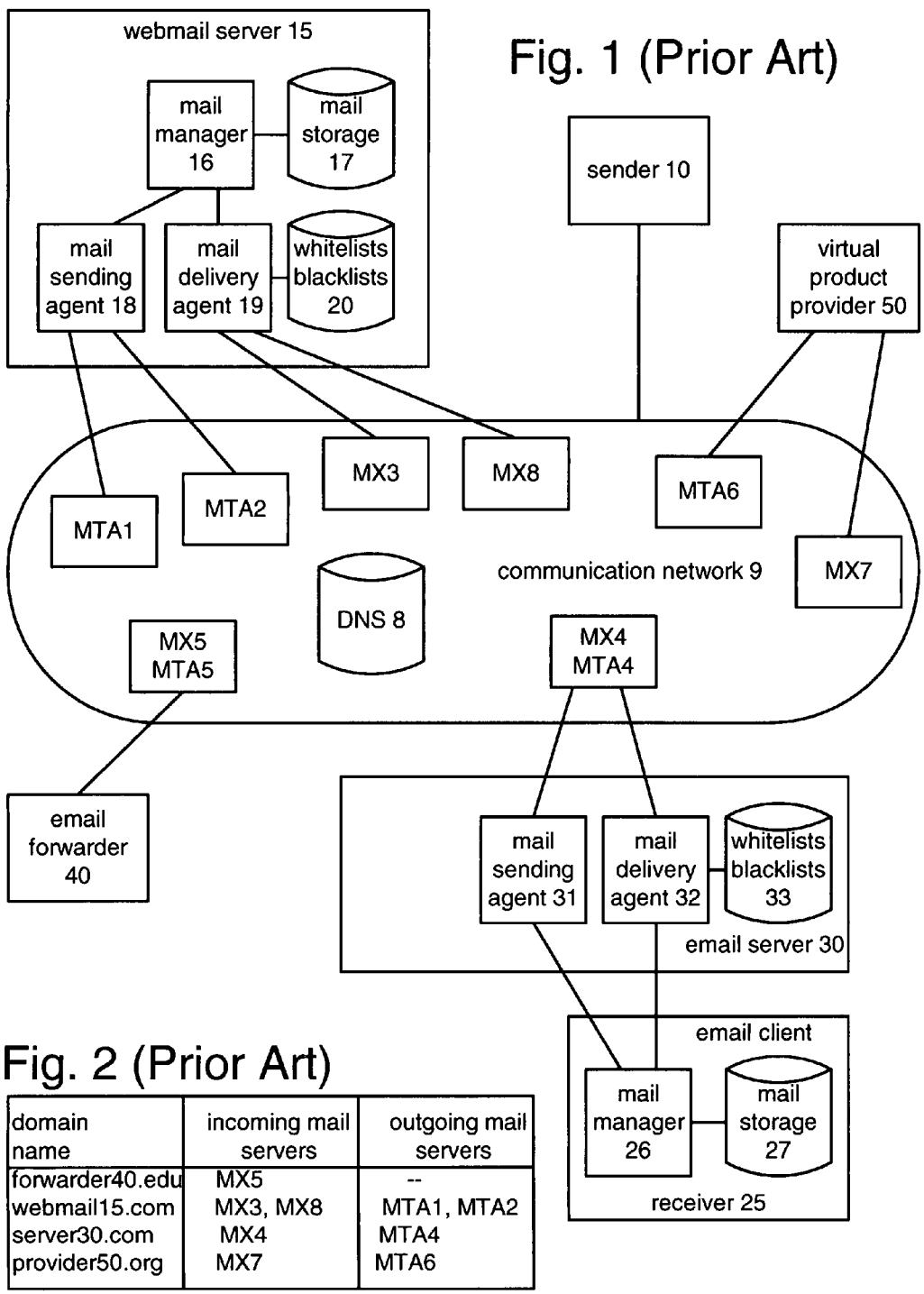

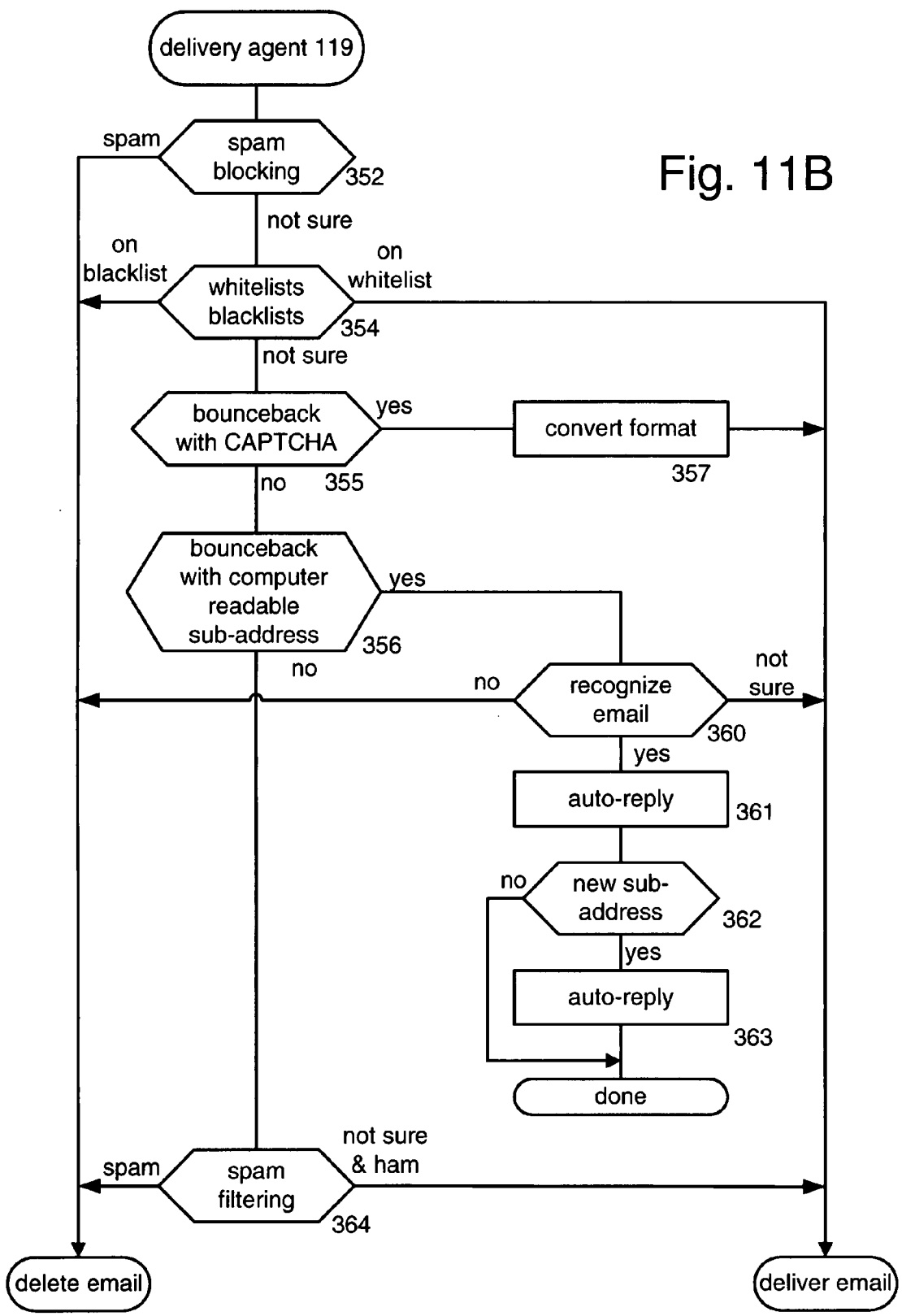

From: receiver25^6E6NAW@mailserver130.com
To: sender10@webmail15.com
Date: January 1, 2007 11:34:30 am
Subject: BOUNCEBACK This is an automated response. The message below that you sent was blocked as possible spam. If this is a legitimate message, please resend to me with the sub-address indicated in the "From:" above. Thank you for resending.

- - - - -
ORIGINAL MESSAGE

Fig. 12

From: receiver25@mailserver130.com
To: sender10@webmail15.com
Date: January 1, 2007 11:34:30 am
Subject: BOUNCEBACK This is an automated response. The message below that you sent was blocked as possible spam. If this is a legitimate message, please resend to me with the sub-address indicated below. DO NOT MERELY REPLY, you must retype the "To:" address as below. Please use this sub-address for all future mail to me. Thank you for resending.

receiver25^ [handwritten: 6E6NAW] @mailserver130.com

- - - - -
ORIGINAL MESSAGE

From: receiver25@mailserver130.com
To: sender10@webmail15.com
Date: January 1, 2007 11:34:30 am
Subject: BOUNCEBACK This is an automated response. The message below that you sent was blocked as possible spam. If this is a legitimate message, please type the sub-address characters shown into the address field below, then click SEND. Please use this sub-address for all future mail to me. Thank you for resending.

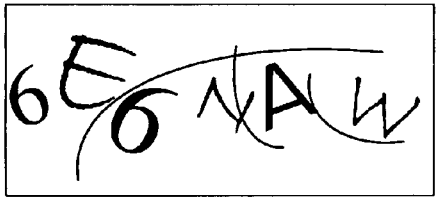

receiver25^ [        ]   @mailserver130.com

[SEND]

- - - - -
ORIGINAL MESSAGE

Fig. 15

SENDER AUTHENTICATION FOR DIFFICULT TO CLASSIFY EMAIL

BACKGROUND OF THE INVENTION

The present invention relates to sender authentication for email, and more particularly, is directed to highly reliable sender authentication for email that is difficult to classify via conventional probabilistic filtering.

Unsolicited commercial email, commonly referred to as spam, is an ever-increasing problem. Email service providers are constantly battling spammers, deploying ever more sophisticated schemes for blocking known spam. In turn, spammers keep using more sophisticated message creation techniques, to avoid being blocked.

With present spam fighting schemes, there is still a portion of email traffic that cannot be definitively determined to be spam or definitively determined to be ham, that is, non-spam. Accordingly, there is a need for an improved way to process the email that is difficult to classify as spam or ham.

SUMMARY OF THE INVENTION

In accordance with an aspect of this invention, there is provided a method for authenticating a received email, comprising deciding whether the sender domain of the received email indicates that the sender is likely to be a spammer.

When the sender is not likely to be a spammer, a first type of bounceback email with a new sub-address is sent to a sender of the received email, the first type of bounceback email having the new sub-address in computer-readable form.

When the sender is likely to be a spammer, a second type of bounceback email with a new sub-address is sent to a sender of the received email, the second type of bounceback email having a test that must be solved to yield the new sub-address.

In accordance with another aspect of this invention, there is provided a method for processing a bounceback email, comprising receiving a bounceback email relating to an original email, checking whether the original email originated from the receiver of the bounceback email, and when the original email originated from the receiver of the bounceback email, replying to the bounceback email without human involvement.

In accordance with yet another aspect of this invention, there is provided a method for processing a bounceback email, comprising receiving a bounceback email relating to an original email, the bounceback email including a new sub-address generated by a sender of the bounceback email, determining that the bounceback email includes a test requiring human participation to solve, the test involving the new sub-address, reformatting the bounceback email, and delivering the reformatted bounceback email to an inbox.

In accordance with a further aspect of this invention, there is provided a method for updating a private Sender Policy Framework (SPF) database, comprising sending a bounceback email to a sender of the received email, receiving a reply-to-bounceback email in reply to the bounceback email, determining that the sender of the received email is authentic upon receipt of the reply-to-bounceback email, and entering the authenticated sender information into the private SPF database.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 1 is a diagram showing how various conventional computers and communication facilities are arranged;

FIG. 2 is a chart showing a portion of a domain naming server look-up table;

FIGS. 11A-11D are flowcharts showing the operation of software according to the present invention;

FIG. 12 is a diagram of a bounceback email with a sub-address readable by a computer;

FIG. 13 is a diagram of a Completely Automated Public Turing Test to Tell Computers and Humans Apart (CAPTCHA);

FIGS. 14-15 are diagrams of a bounceback email with a sub-address encoded in a CAPTCHA.

DETAILED DESCRIPTION

Figures 3, 4A, 4B, 4C, 4D:
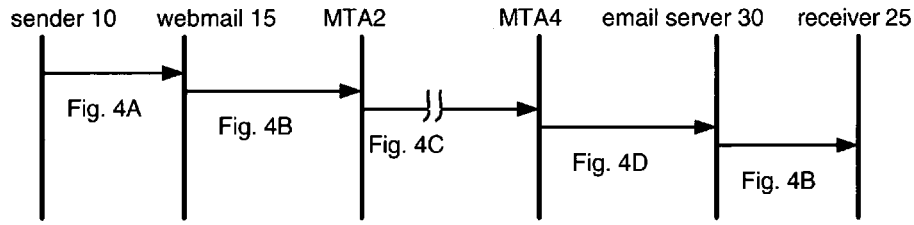
FIG. 3 is an inter-entity communication diagram showing how an email is sent in the configuration of FIG. 1 in one scenario.
FIGS. 4A-4D are charts showing the message and envelope path information for an email as it is sent according to the diagram of FIG. 3.

The portion of email traffic that cannot be definitively determined to be spam or definitively determined to be ham (non-spam) is processed by sending a bounceback email to the sender, requiring the sender to reply using a sub-address created by the bounceback generator. The type of bounceback email depends on whether the domain of the received email indicates that the sender is or is not likely to be a spammer. When the sender is not likely to be a spammer, the bounceback email includes a sub-address in computer readable form. When the sender is likely to be a spammer, the bounceback email includes a test that must be solved to yield the sub-address; preferably, the test is very difficult for a computer to solve but reasonably easy for a human to solve. When a reply email to the bounceback email ("reply bounceback") is received, the presence of the sub-address indicates that the sender is not a spammer, so the reply bounceback is determined to be ham and delivered to the destination mailbox. The bounceback can have the sub-address encoded in such a way that a human must be involved in decoding, which is appropriate for situations where the envelope sender domain of the original email is considered suspicious. The bounceback can have the sub-address presented in a computer readable format when the envelope sender domain of the original email is more trustworthy, if authenticated.

For example, emails from domains "Citibank.com" and "Cheapviagra.com" may both be from spammers. However, the authenticated domain Citibank.com is more trustworthy than the authenticated domain Cheapviagra.com.

FIG. 1 is a diagram showing how various conventional computers and communication facilities are arranged. Sender 10, webmail server 15, email server 30, email forwarder 40 and virtual product provider 50 are coupled to communication network 9 via suitable wireline or wireless facilities. Webmail server 15, email server 30, email forwarder 40 and virtual product provider 50 are referred to herein as external servers, since they are external to communication network 9.

Email can be sent from and to email accounts hosted at a webmail server or a private email server with email clients. Webmail server 15 is an example of a webmail server, and email server 30 is an example of a private email server. In the example below, email is sent using webmail server 15 and received using email server 30, but in other situations, other configurations are used.

As used herein, a server is at least one general purpose computer programmed to function as described.

Communication network 9, such as the Internet, includes servers designated for sending and receiving mail. A mail sending server is referred to as a mail transfer agent (MTA), while a mail receiving server is referred to as a mail receiver (MX). Some servers are configured to both send and receive email. Communication network 9 includes MTA 1, MTA 2, MX 3, MTA 4, MX 4, MTA 5, MX 5, MTA 6, MX 7 and MX 8, referred to herein as internal servers since they are internal to communication network 9. Communication network 9 also includes domain name server (DNS) 8, which is also an internal server. The mail servers and domain name servers are coupled via suitable communication lines and intermediate relay computers (not shown), so that they can transfer data therebetween.

According to the required protocols for network 9, when an external server couples to network 9, it must identify itself as a row in a look-up table maintained at DNS 8, so that other servers can communicate therewith. In particular, each external server is required to specify the name of a mail server that can receive email directed to the external server, or more specifically, to domains associated with the external server.

FIG. 2 is a chart showing a portion of the look-up table maintained at DNS 8. Each of the external servers is seen to have its incoming mail servers identified in association with the external server. For example, webmail server 15 is associated with the domain name "webmail15.com" and has incoming mail servers MX 3 and MX 8.

An optional protocol for network 9, referred to as sender policy framework (SPF), states that a server may, but is not required to, identify its outgoing mail servers identified in the DNS look-up table, to assist in determining whether email purporting to be from a domain is actually from a domain. SPF is discussed below. For example, webmail server 15 has chosen to participate in SPF and has identified its outgoing mail servers as MTA 1 and MTA 2.

Sender 10 is an individual with a general purpose computer configured to communication with network 9. For example, sender 10's computer may be a personal computer or a cellphone with a browser, or any other suitable configuration. In this example, sender 10 has previously configured an email account at webmail server 15, with an address such as "sender10@webmail15.com", for receiving and sending email.

Webmail server 15 is at least one general purpose computer configured to provide a domain accessible through communication network 9. The services offered by webmail server 15 include providing email accounts so registered individuals can receive and send email via an interface accessible through network 9. Webmail server 15 also stores email for its email accounts. For example, Hotmail, Yahoo and Earthlink offer webmail accounts.

Webmail server 15 includes software processes mail manager 16, mail sending agent 18 and mail delivery agent 19, and also includes mail storage 17 and whitelists/blacklists 20. Generally, mail manager 16 enables a user, such as sender 10, to create an email message, then transfers the email message to mail sending agent 18, which in turn sends the email message to one of MTA 1 and MTA 2 for delivery to the named recipient. Mail manager 16 stores a copy of the sent email message in mail storage 17. Mail delivery agent 19 receives, via MX 3 and MX 8, email messages destined for the email accounts at webmail server 15, and transfers the messages to mail manager 16, which stores the messages in mail storage 17. When a user logs in to their email account, the newly delivered messages are accessible through an interface via network 9. Generally, mail manager 16 enables a user to designate other email accounts for the individual user's whitelists and blacklists. Putting an email account on a whitelist means that mail from that account is always welcome. Putting an email account on a blacklist means that mail from that account is never welcome, and should be automatically deleted so that the user never sees it.

Unsolicited commercial email (spam) is an increasing problem. A spammer typically sends millions of spam emails per day. One form of spam includes a hyperlink to a website where the visitor is supposed to spend money. This spam is reasonably easy to detect based on scanning the contents of the email for hyperlinks to websites known to be associated with spammers. Another way to detect this spam is to search for suspect words, such as "Viagra" or variants thereof: v1agra, v!agra, vLagra and so on. Another form of spam encourages a particular behavior, such as the so-called "pump and dump" stock schemes that encourage a reader to buy a thinly-traded stock, and when buyers have pushed up the price, the scammer sells his stock. This type of email is harder to detect, particularly since the crucial information is often embedded into an image that is not computer-readable, and gibberish text is included in the email so that it cannot easily be classified as spam. Mail delivery agent 19, discussed further below, usually spends a considerable amount of its processing power in merely deleting spam.

A spammer uses many techniques for disguising the origin of the spam email. If the actual source was easy to determine, the domain could simply be shut down as spamming violates policies of most Internet service providers (ISPs). One way to disguise the source of an email is domain hijacking, wherein the spammer inserts malware software in a server, and the malware sends the spam without the consent of, or even knowledge of, the legitimate domain owner. Another way to disguise the source of an email is zombie computers, wherein the spammer inserts malware software in a user's personal computer, and either (a) the personal computer is used as an MTA to send spoofed spam email, or (b) the computer sends email from the user's account without the user's consent or knowledge. Another way to disguise the source of an email, frequently used along with zombie computers, is simply to provide false information in the email message header and email electronic envelope (discussed below). False information in the message header is referred to as email account spoofing.

Email server 30 is at least one general purpose computer configured to host email accounts, and executes software to form processes: mail sending agent 31 and mail delivery agent 32. Email server 30 is coupled to communication network 9 and to email client 25, also referred to receiver 25. Generally, email server 30 receives email sent from MX 4 to mail delivery agent 32. Mail delivery agent 32 determines if an incoming email is spam, generally using whitelists and blacklists defined by end-users and stored in storage 33, and if so, deletes the spam, then stores the ham (non-spam email)

in a storage (not shown). Mail sending agent 31 receives email from email client 25 and forwards the email to MTA 4.

Email client 25 is a general purpose computer executing software as described herein. In particular, mail manager 26 connects to mail delivery agent 32, requests email addressed to the end-user having an email address such as "receiver25@server30.com", and stores the email in mail storage 27. Mail manager 26 also sends email originated by the end-user of email client 25 to mail sending agent 31. Microsoft Outlook is an example of a mail manager software program.

Email forwarder 40 is a general purpose computer that hosts a domain which provides email forwarding services. For instance, it is widespread for colleges to provide email forwarding accounts for their graduates. The graduate selects an address such as "JoeGrad@college.edu" and email forwarder 40 simply forwards any email sent to this address to an actual email account, such as "JoeGrad@webmail5.com" or "JoeGrad@server30.com".

Virtual product provider 50 is a general purpose computer that hosts a domain that enables visitors to the domain to send email including information originated at the domain. For example, a greeting card provider sends electronic greeting cards using the card purchaser's email address. As another example, online newspapers generally allow a subscriber to send articles to others, and the articles have the email address of the subscriber.

FIG. 3 is an inter-entity communication diagram showing how an email is sent in the configuration of FIG. 1. In this scenario, sender 10 sends an email to receiver 25. FIGS. 4A-4D are charts showing the message and envelope path information for the email as it is sent according to the diagram of FIG. 3.

First, sender 10 provides the content of the email, such as a message "Hi. Meeting tomorrow at 3 pm will be in conference room B. See you then!". FIG. 4A depicts this as message content 52. Then sender 10 provides the email address of the recipient, and (optionally) the subject of the message. As shown in FIG. 4A, the destination "TO:" and the subject line are part of message header 54.

When sender 10 clicks a SEND button, mail sending agent 18 of webmail server 15 automatically adds a date and time stamp, and the sender's email account in the "FROM:" part of message header 54, as shown in FIG. 4B. Then, mail sending agent 18 sends the email to MTA 2.

MTA 2 creates an electronic message envelope, shown in FIG. 4C as envelope 56, including its own identity and other information (not shown) such as another timestamp and the internet protocol (IP) address of webmail server 15. Then MTA 2 sends the message to a relay mail server (not shown). Multiple relay mail servers may be involved in transmitting the message. Eventually, the message is transmitted to the incoming mail server associated with the destination address, namely, MX 4. Each mail server appends its name and other administrative information to envelope 56, so that the path taken by the message is recorded in envelope 56.

Mail manager 26 of email client 25 typically hides envelope 56 from the end-user, displaying only message header 54, as shown in FIG. 4B.

Spammers often forge information in the envelopes of their messages, such as by adding phantom path information. Anonymous remailers are sometimes employed, which eliminate the message envelope from the actual source to the remailer, and provide only the path information from the remailer to the destination.

The final sending MTA is the only path information that is always completely truthful in an otherwise unauthenticated system. In other words, a spammer cannot forge the final sending MTA.

Figure 5:
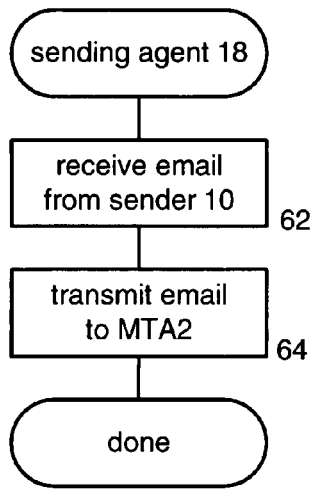
FIGS. 5-7 are flowcharts depicting operation of software entities in FIG. 1.

FIG. 5 shows the operation of sending agent 18. Sending agent 31 operates similarly. At step 62, an email is received from sender 10. At step 64, the email is sent to MTA 2.

Figure 6:
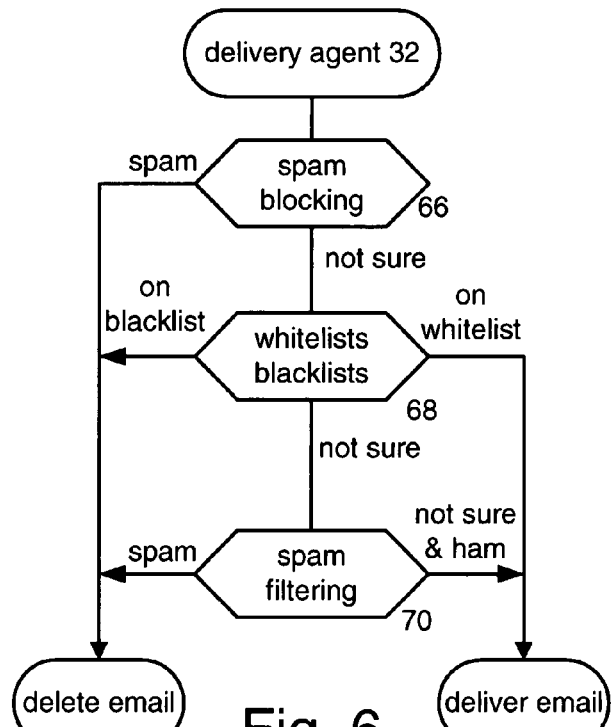

FIG. 6 shows the operation of delivery agent 32. Delivery agent 19 operates similarly. In some embodiments, some of these steps are omitted or performed in a different sequence.

At step 66, delivery agent 32 executes spam blocking software on the email. Several third party providers sell spam blocking software. Often, the seller constantly updates a central registry of spam related information that is used as a look-up table by the spam blocking software. The spam blocking software decides whether the email is definitively spam or cannot be classified with certainty.

Figure 7:
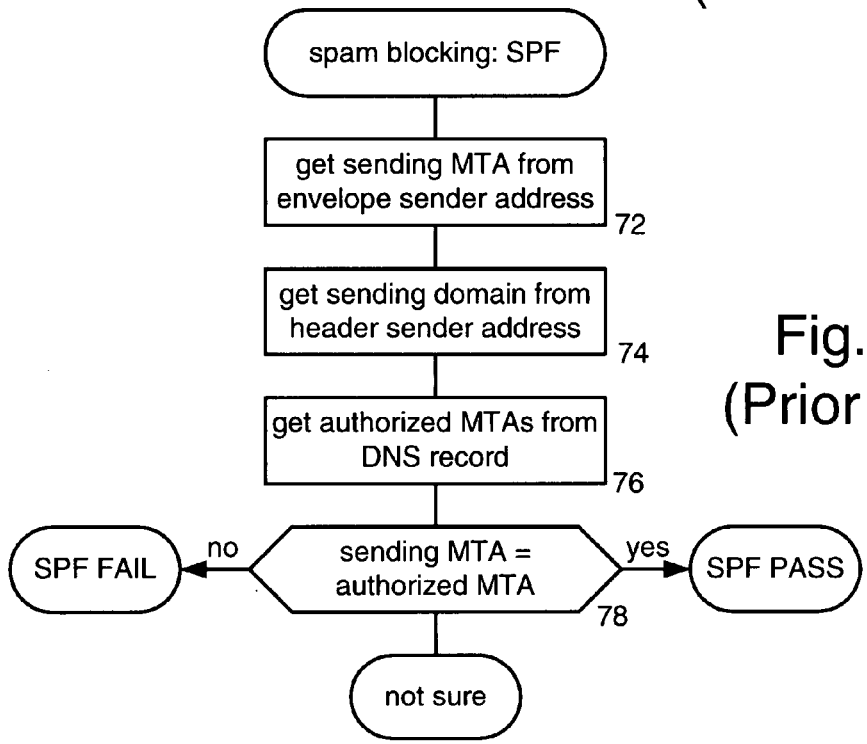

FIG. 7 shows the operation of a particular type of spam blocking software using SPF. At step 72, the sending mail server is extracted from the message envelope; in this example, MTA 2 is obtained from envelope 56. At step 74, the sending domain is obtained from the header sender address; in this example, the header sender address is "sender10@webmail5.com" and so the sending domain is "webmail5.com". At step 76, the authorized sending MTAs for the domain are obtained from the DNS look-up table; in this example, as seen in FIG. 2, the domain webmail15.com has authorized outgoing mail servers MTA 1 and MTA 2. At step 78, the sending MTA (MTA 2) is compared with the authorized MTAs (MTA 1 and MTA 2) to see if there is a match. If there is a match, then the email receives an SPF PASS, since the authorized MTA and the actual MTA are the same. If there is no match, then the spam blocking software follows its user's preference rules. In the DNS SPF records, some users specify that any mail that does not receive an SPF PASS should receive an SPF FAIL, while other users specify that any mail that does not receive an SPF PASS should be considered as a "not sure" and subjected to further processing. Typically, mail with an SPF FAIL is considered to be spam and discarded.

If the sending domain does not participate in SPF, then a positive determination of SPF PASS or SPF FAIL is impossible at this point, and so a "not sure" outcome is generally allowed by the user's preference rules.

Some spam blocking software employs a technique called "best guess SPF", wherein if there is no authorized sending MTA for the domain in the DNS look-up table, then the receiving MX for the domain will be obtained from the DNS look-up table. The IP address for the receiving MX is compared with the IP address for the sending MTA listed in the envelope, and if they match, the email is considered ham. This technique relies on the fact that many domains use the same server for the MTA and MX.

Other mail authentication methods exist, such as domain keys identified mail (DIUM).

Returning to FIG. 6, at step 68, delivery agent 32 uses the whitelists and blacklists in storage 33, if any, created by the email account holders to assist in classifying incoming email as spam or ham.

At step 70, delivery agent 32 executes spam filtering software on the email. Several third party providers sell spam filtering software. Generally, spam blocking software looks at external characteristics of the message, such as its envelope, while spam filtering software processes the message content. An example of message content processing is to calculate a hash value for the message and see if it matches the hash value for known spam. Another example of message content processing is to see if there are links to known spam sites in the email content. Messages that are not definitively determined to be spam are then delivered to the email account.

Figure 8A:
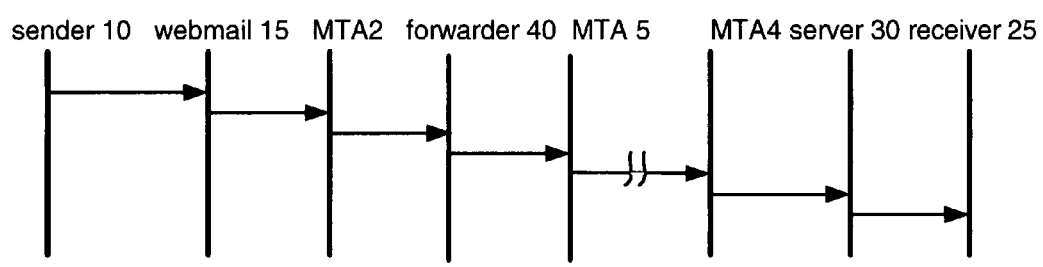
FIGS. 8A-8B are inter-entity communication diagrams showing how an email is sent in the configuration of FIG. 1 in other scenarios.

FIG. 8A is an inter-entity communication diagram for the scenario of an email being sent using forwarder 40. It will be appreciated that the basic SPF scheme fails in the case of forwarders, since the forwarder appears to be the source of the email in the envelope, and this is practically guaranteed to be a different server than the original sender's domain server. Accordingly, there is an SPF work-around called Sender Rewriting Scheme (SRS), which is not widely used, to cover this situation.

Figure 8B:
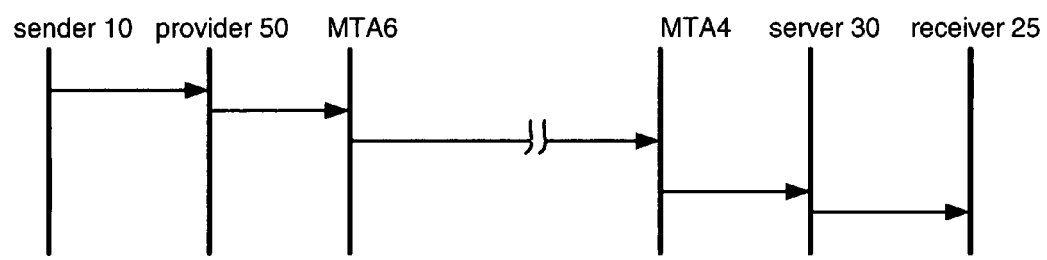

FIG. 8B is an inter-entity communication diagram for the scenario of an email being sent from virtual product provider 50 on behalf of an originating sender. SPF authenticates the envelope sender, i.e., the domain of virtual product provider 50 assumed to participate in SPF, but the envelope sender domain is typically independent of the message sender domain.

According to the present invention, an email delivery agent is modified to process emails that have been difficult to classify as spam or ham by sending a bounceback email and requiring the sender of the email to do something in response to the bounceback email. In some embodiments, email delivery agents are modified to automatically respond to the bounceback.

Figure 9A:
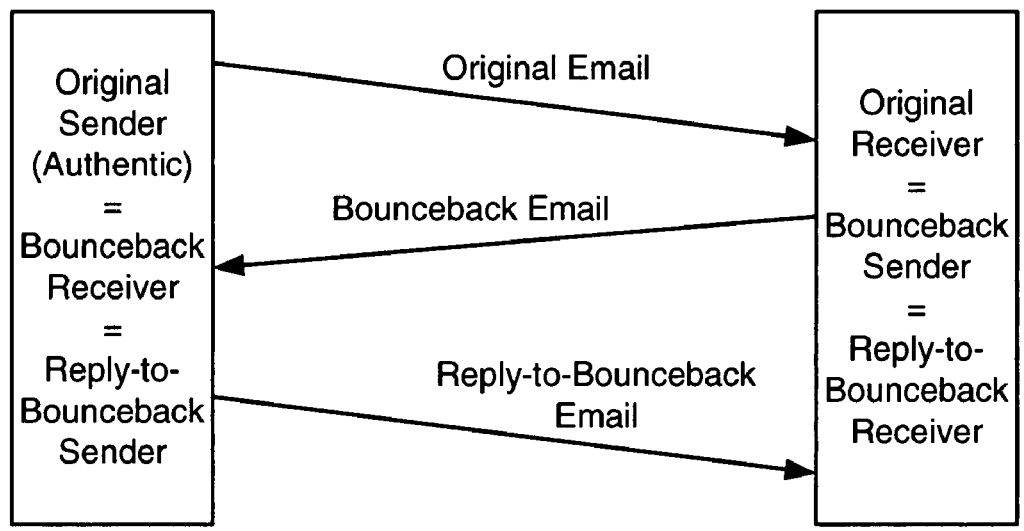
FIGS. 9A-9B are diagrams showing email sequences in different scenarios.
Figure 9B:
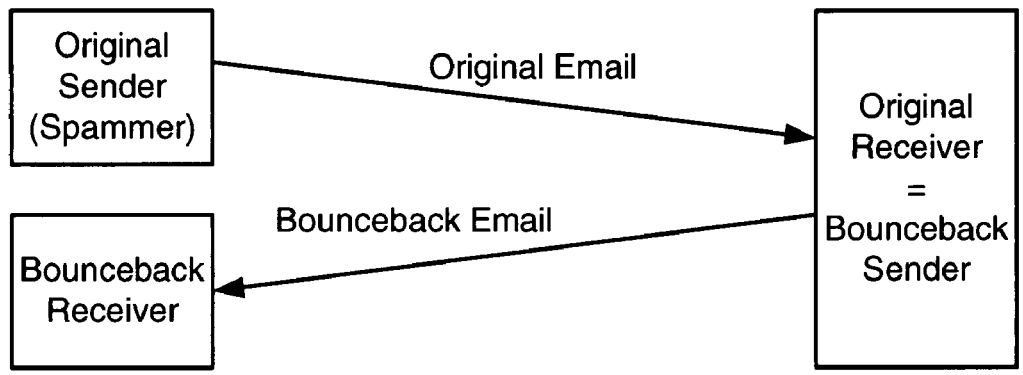

FIGS. 9A-9B are diagrams showing email sequences in different scenarios.

In FIG. 9A, an original sender sends an original email having original content to an original receiver; the original receiver sends a bounceback email to the original sender, which replies with a reply-to-bounceback that enables the original receiver to authenticate the original sender. Assuming that the bounceback email and the reply-to-bounceback email include the original content, the original receiver now strips the resending instructions added by the original receiver, as shown in FIGS. 12 and 14, from the reply-to-bounceback and delivers the original content to the destination email-box. In other embodiments, the original email is retained by the original sender, and delivered to the destination email box only if the sender of the original email is authenticated within a predetermined time. As used herein, authenticate means to have evidence that a named sender is the same as an actual sender. In this scenario, the original sender is the bounceback email receiver and also is the reply-to-bounceback sender; the original receiver is the bounceback email sender and also is the reply-to-bounceback receiver.

In FIG. 9B, a spammer sends an original email to an original receiver. Here, the spammer has put a spoofed or false address in the email so that the email appears to originate from a party other than the spammer. The original receiver sends a bounceback email to the party who appears to be the original sender. The bounceback email receiver has no reason whatsoever to send a reply-to-bounceback email to the bounceback sender. Accordingly, the original email will never be delivered by the original receiver to any mailbox. In some embodiments, the original email is deleted when the sender has not been authenticated within a predetermined time.

FIGS. 10A-10E are diagrams showing the location of software according to the present invention. FIGS. 10A-10E are similar to FIG. 1, and for brevity, only the differences will be discussed.

Figure 10A:
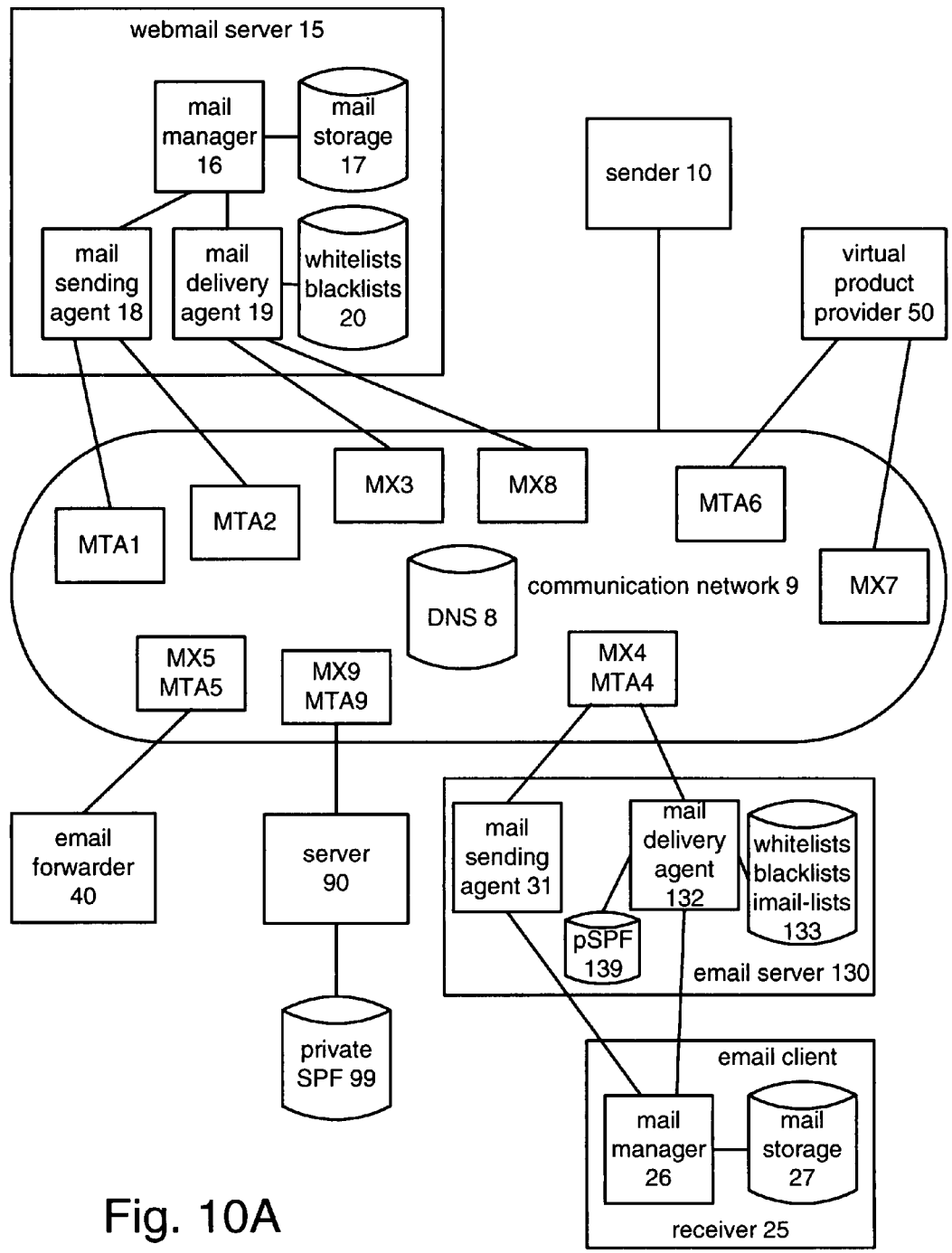
FIGS. 10A-10E are diagrams showing the location of software according to the present invention.

FIG. 10A shows email server 130 having mail delivery agent 132, imail-lists 133 and private SPF database 139. Mail delivery agent 132 processes incoming mail to delete spam and delivers the non-spam email to email client 25. FIG. 10A also shows server 90 as using mail sending agent MX9 and mail transfer agent MTA9. Server 90 is coupled to private SPF database 99, which is a centralized database that aggregates the combinations of domain/mail sending agents authenticated using the techniques described herein.

Figure 10B:
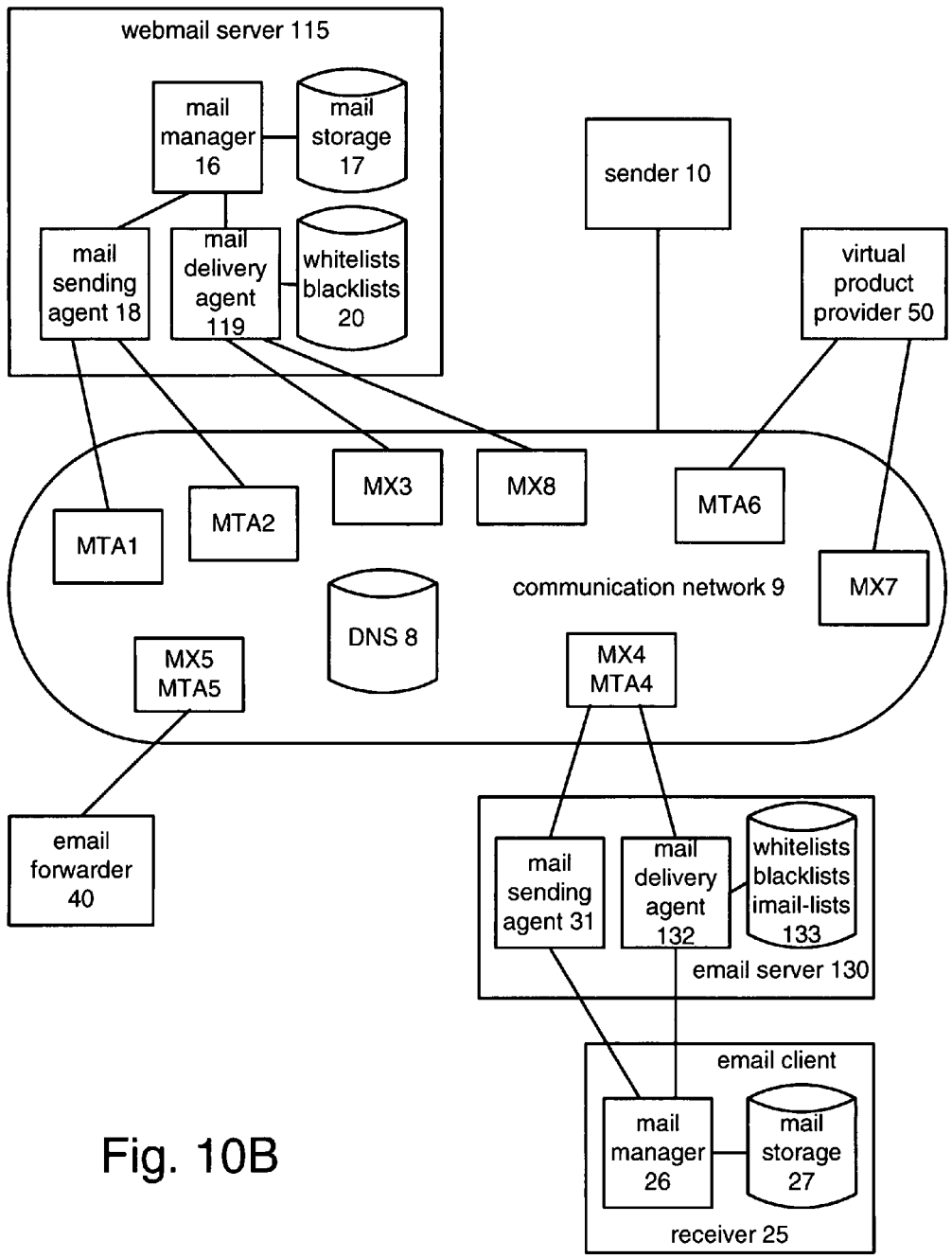

FIG. 10B shows webmail server 115 having mail delivery agent 119, which is able to automatically reply to bouncebacks containing a computer-readable sub-address from mail delivery agent 132, without human intervention.

Figure 10C:
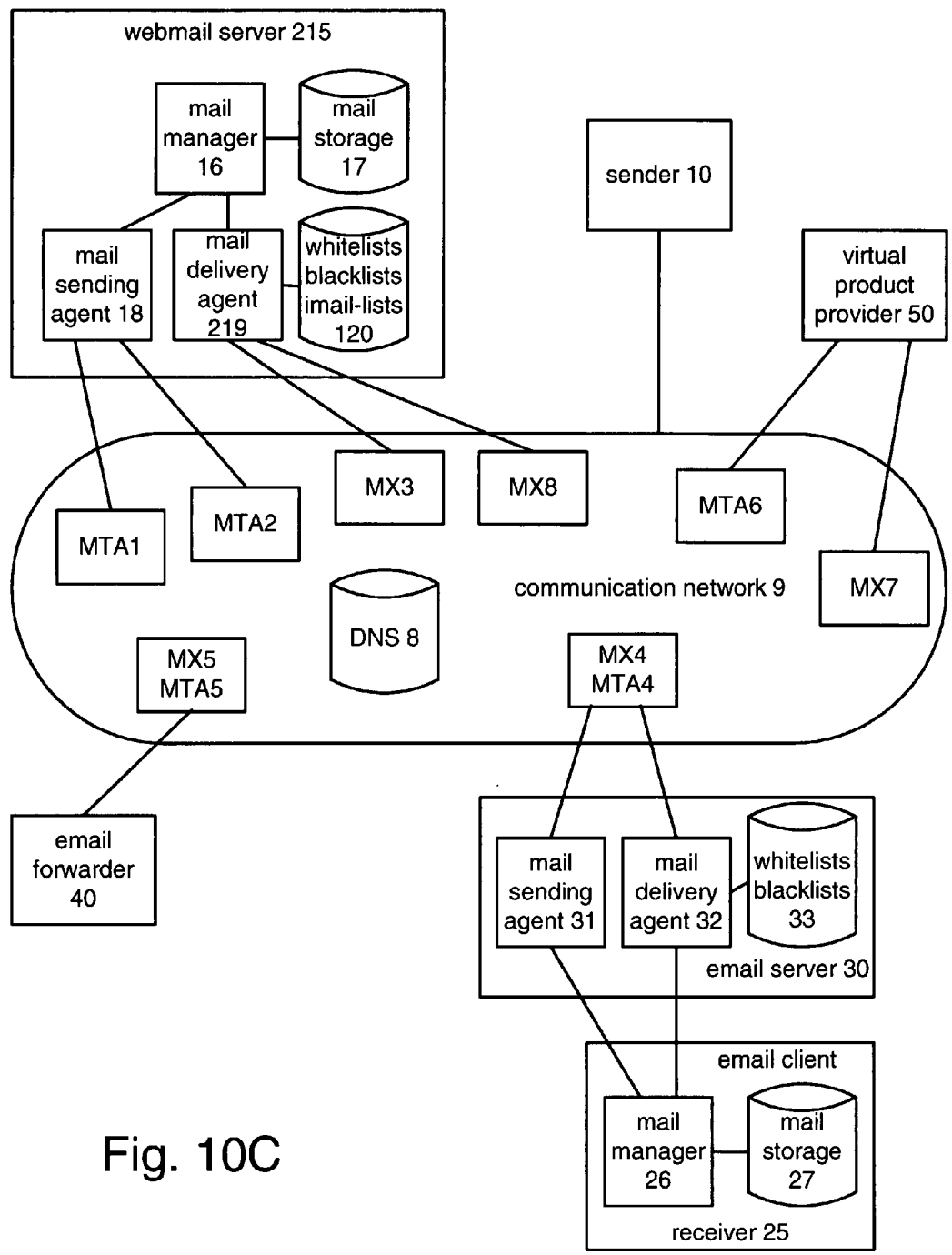

FIG. 10C shows webmail server 215 having mail delivery agent 219 and imail-lists 120. Mail delivery agent 219 processes incoming mail to delete spam and delivers the non-spam email to individual email accounts hosted at webmail server 215. Mail delivery agent 219 also automatically replies to bouncebacks containing a computer-readable sub-address, without human intervention.

Figure 10D:
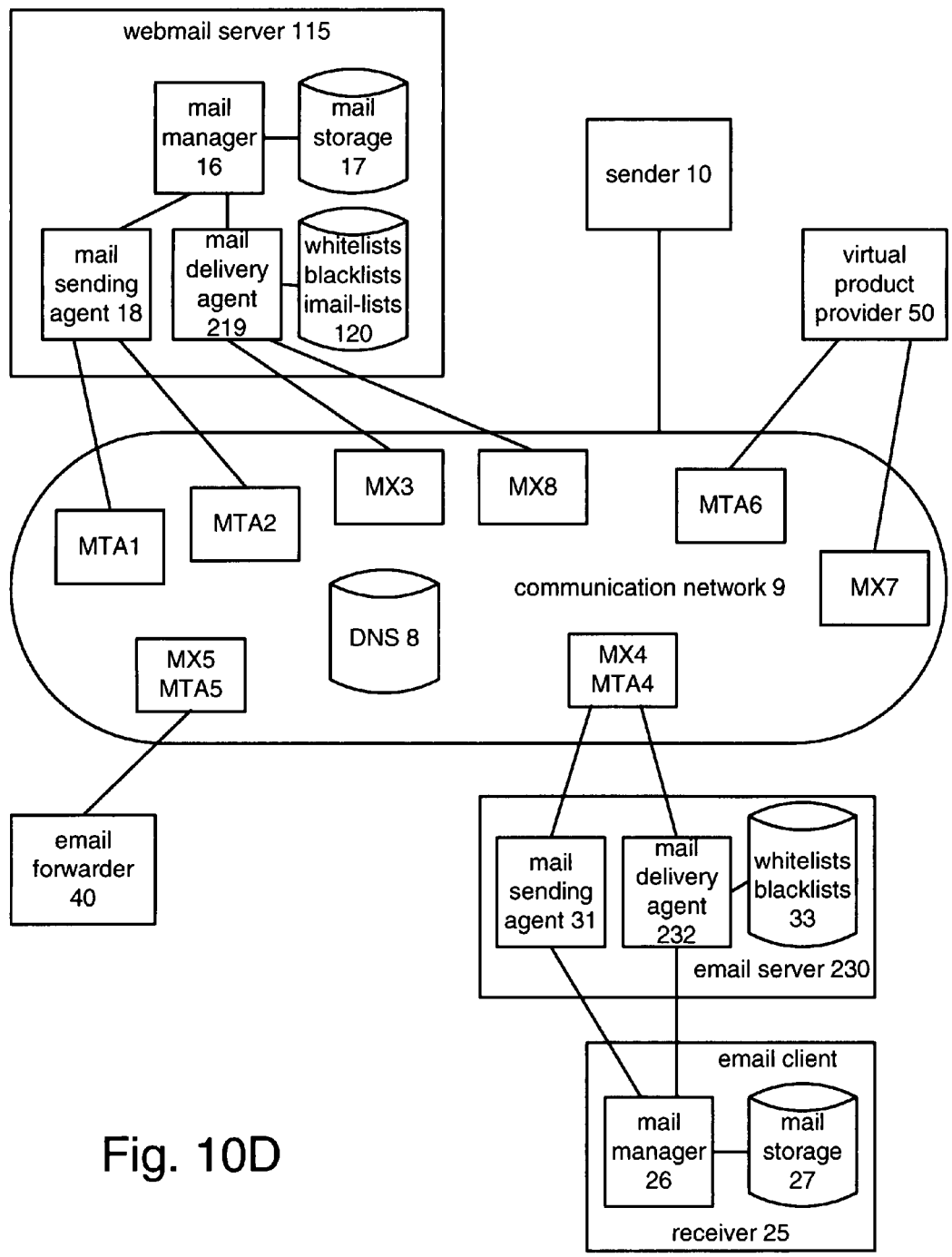

FIG. 10D shows email server 230 having mail delivery agent 232, which is able to automatically reply to bouncebacks containing a computer-readable sub-address from mail delivery agent 132, without human intervention.

Figure 10E:
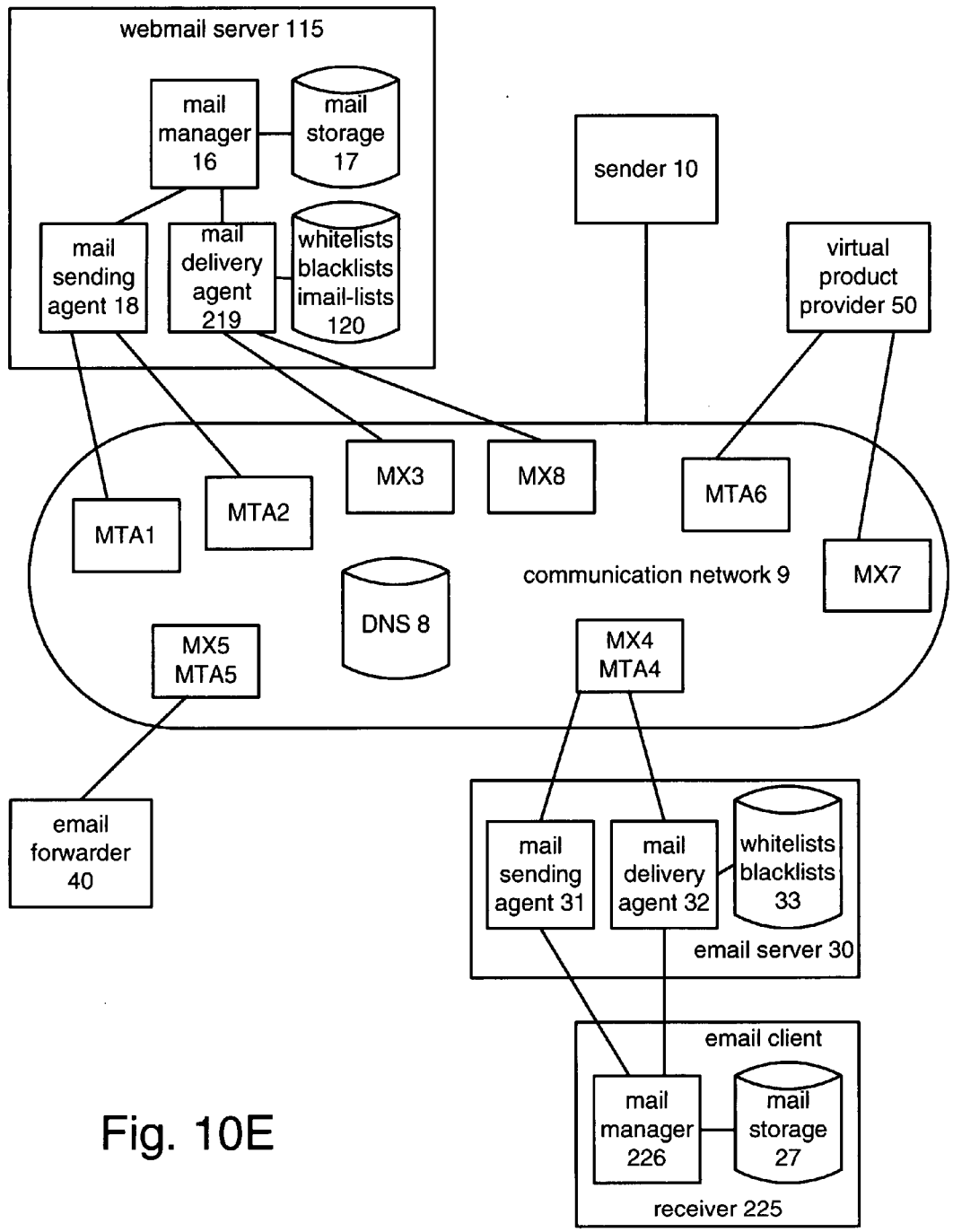

FIG. 10E shows email client 225 having mail manager 226, which is able to automatically reply to bouncebacks containing a computer-readable sub-address from mail delivery agent 132, without human intervention.

FIGS. 11A-11D are flowcharts showing the operation of software according to the present invention. FIGS. 11A-11D are similar to FIG. 6, and for brevity, only the differences will be discussed.

Figure 11A:
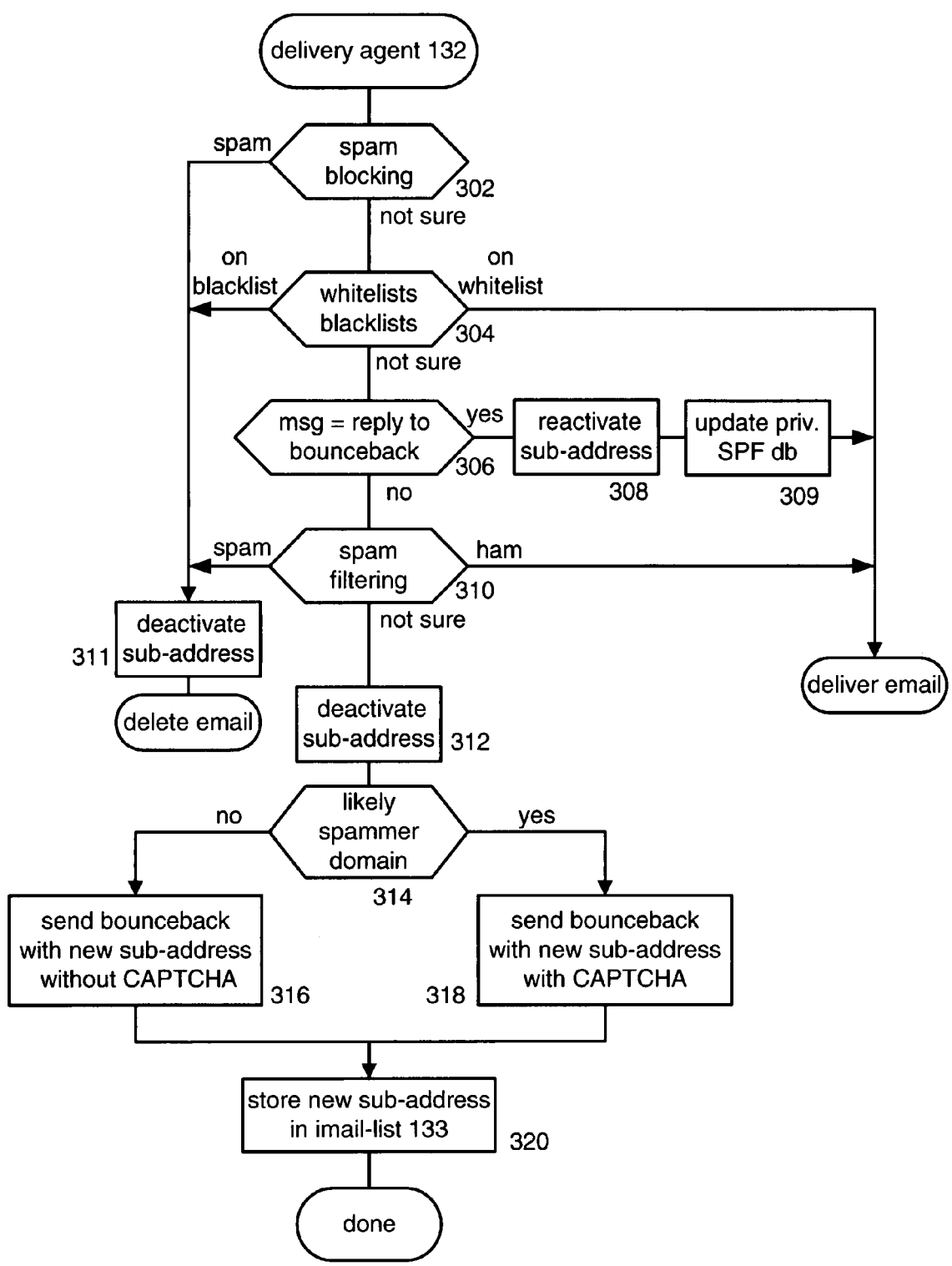

FIG. 11A shows the operation of delivery agent 132 in FIG. 10A. Let it be assumed that an email has been received, and after spam blocking, whitelist/blacklist comparison, and spam filtering, it is still not clear whether the email is spam or ham. In FIG. 11A, at step 302: spam blocking and/or at step 310: spam filtering, the spam blocking and/or spam filtering can also reference a private SPF database, discussed below, that is maintained locally or remotely.

As used herein, an email sub-address refers to an add-on to a regular email address that enables an email account holder to essentially create sub-accounts. Typically, a sub-address is identified by a special character, such as a circumflex accent (^) followed by characters identifying the sub-address. For example, in the email address "sender10^t3pq7@webmail15.com", the sub-address is "t3pq7". Sub-addresses are conventionally used to enable receipt of wanted email while fighting spam, such as by Zoemail, www.zoemail.com, which uses patented technology from AT&T Labs, and calls the sub-address a "key".

As used herein and in the claims, an "email system based on sub-addresses" means a software program able to receive email and decide whether to deliver the email to an inbox based, at least in part, on whether the destination email address includes a sub-address. Delivery agent 132 is part of an email system based on sub-addresses.

When an email is unambiguously determined to be spam, at step 311, the sub-address, if any, associated with the spam email is deactivated prior to deleting the spam email.

At step 312, delivery agent 132 determines whether the email sender address contains a sub-address. If not, processing continues to step 314. If a sub-address is present, delivery agent 132 updates imail-list 133 to indicate the sub-address should be ignored henceforth. If email is subsequently received from this email sender address, its sub-address will be ignored, which increases the likelihood that the spam filtering at step 310 will decide that the email is spam.

At step 314, delivery agent 132 determines whether the email sender address is associated with a domain likely to be controlled by a spammer. One way of determining this is to use a score generated during spam filtering at step 310.

Another way of determining this is to check a reputation list maintained by the provider of the spam filtering software. A further way of determining this is to check a third party reputation list, which may or may not require payment of a fee to the third party. For example, if the domain in the email sender address is "Citibank", then this would not be spam assuming that the email sender address has not been forged.

If the domain of the email address sender is determined to be not likely to be associated with a spammer, then at step 316, delivery agent 132 sends a bounceback email with a computer-readable sub-address. The objective is to make the sender do some work to authenticate the email, but not an excessive amount of work. Generally, if the sender email address has been forged, then the bounceback will be ignored by the genuine owner of the address, and the original email can be safely deleted as spam, without the risk of deleting a ham email. Processing continues at step 320.

An important aspect of delivery agent 132 is that it enables delivery of email to the user's inbox although the email did not originally include a sub-address. In contrast, conventional sub-address based systems such as Zoemail and Reflexion require a sub-address before delivering email to an inbox. That is, a conventional sub-address based system challenges or rejects 100% of ham lacking a sub-address, whereas the present system enables delivery of ham lacking a sub-address as long as there is a reply to the system-generated bounceback. As explained herein, the reply-to-bounceback email can be generated manually or automatically.

FIG. 12 is a diagram of a bounceback email with a sub-address readable by a computer. Specifically, the sub-address is contained in the bounceback sender's address, so it can readily be parsed by a computer. However, if the mail delivery agent that receives the bounceback is not configured to automatically reply to the bounceback (see FIG. 11B discussion below), then the bounceback will be delivered to an email account, and the account holder can simply click on a conventional email reply button to send a reply email to the bounceback email ("reply bounceback"). This requires very little effort on the part of the account holder.

If the domain of the email address sender is determined to be likely to be associated with a spammer, then at step 318, delivery agent 132 sends a bounceback email with an encoded sub-address. The objective is to make the sender do substantial work to authenticate the email, preferably the type of work that requires a human and is extremely difficult for a computer to perform properly.

FIG. 13 is a diagram of a Completely Automated Public Turing Test to Tell Computers and Humans Apart (CAPTCHA). A CAPTCHA is a type of challenge-response test used in computing to determine whether or not the responder is human. A common type of CAPTCHA requires that the user type the letters of a distorted and/or obscured sequence of letters or digits that appears on the screen. Conventional CAPTCHA programs include Gimpy, which randomly gets a word from a dictionary and then distorts it using different colors, by stretching letters and adding extra features such as dots and lines, ESP-PIX, ESP-TEXT and EZ-GIMPY, operational at www.captcha.net.

FIG. 14 is a diagram of a bounceback email with a sub-address encoded in a CAPTCHA. This bounceback requires a human to type the entire destination address, receiver25^6E6NAW@mailserver130.com, in the reply bounceback, a considerable burden that would not be performed by a spammer, as it would be uneconomic for the spammer to pay humans to respond to bouncebacks.

FIG. 15 is a diagram of another bounceback email with a sub-address encoded in a CAPTCHA. The format of this message is less burdensome for a human, as only the sub-address need be typed, not the entire email address. In some embodiments, email delivery software automatically converts email according to the FIG. 14 format into email according to the FIG. 15 format.

At step 320 of FIG. 11A, delivery agent 132 stores the new sub-address in imail-list 133 as a valid sub-address, and processing is complete.

Continuing with the exemplary scenario, let it be assumed that a reply bounceback subsequently arrives. At step 306, delivery agent 132 detects that the sub-address of the reply bounceback matches a valid sub-address stored in imail-list 133, and if there is a match, at step 308, reactivates the sub-address, if any, that was deactivated at step 312. At step 309, delivery agent 132 updates private SPF database 139 and/or private SPF database 99 (see below). The email message that triggered the reply bounceback is now delivered to the email account that it was addressed to. In some embodiments, the text added to the original message during the bounceback and reply to bounceback path is automatically removed from the message. In some embodiments, the entire reply bounceback email is delivered to the email account that it was addressed to.

In general, the fact that a domain/mail sending agent pair has been authenticated is valuable information. In some embodiments, mail delivery agent 132 saves this valuable information in private SPF database 139, so that future emails can be authenticated simply by verifying the domain/MTA pair in private SPF database 139. In these embodiments, at step 302, delivery agent 132 first consults DNS database 8 for public SPF records, and if not found, then consults private SPF database 139 for previously authenticated domain/mail sending agent pairs.

In other embodiments, in addition to or instead of saving the authenticated pairs locally, the authenticated pairs are saved in a centralized database, namely, private SPF database 99 maintained by server 90. In these embodiments, at step 310, delivery agent 132 incorporates the information in private SPF database 99 and private SPF database 139 into a statistical analysis of the incoming email. In some embodiments, private SPF database 99 is used at step 304 when the envelope sender domain of the incoming email is whitelisted.

A variety of techniques can be used for updating private SPF database 99. For instance, delivery agent 132 may update private SPF database 99 only after a pair has been used twice, or only if delivery agent 132 is on an "authorized updater" list. Other techniques will be apparent to those of ordinary skill. The updating occurs in a secure manner, such as by using public key encryption or other secure transmission techniques.

FIG. 11B shows the operation of delivery agent 119 in FIG. 10B. Let it be assumed that a bounceback has been received by delivery agent 119, such as a bounceback generated as described above. Delivery agent 119 has been modified so that at step 355, delivery agent 119 detects whether a received email contains a CAPTCHA. If not, processing continues at step 356. If a received email contains a CAPTCHA, then at step 357 the format of the received email is converted from that of FIG. 14 to the format of FIG. 15, so that the human recipient has a text field in which to type what is in the CAPTCHA and a button to click when the CAPTCHA response is entered. The converted email is then delivered to the inbox. Actuation of the button by a reader of the email causes a reply-to-bounceback email to be sent to the sender of the bounceback email having the CAPTCHA, the reply-to-bounceback containing the typed information responsive to the CAPTCHA.

At step 356, delivery agent 119 detects whether a received email is a bounceback with a digital sub-address. As used herein, digital is synonymous with computer-readable. More specifically, delivery agent 119 checks whether the received email has a computer-readable sub-address, such as by looking for the presence of a sub-address character (^) in the message header's FROM: field. If there is no computer-readable sub-address, the bounceback email is delivered to the email account, and a human must reply.

If the bounceback email lacks a computer-readable sub-address, then processing continues at step 364.

If the bounceback email has a computer-readable sub-address, then at step 360, delivery agent 119 checks whether it recognizes the email message that was bounced. For example, delivery agent 119 may compare the TO: address in the bounced email with the TO: addresses of messages recently sent by mail sending agent 18, say, in the most recent 10 minutes or other suitable time.

If the content of the bounced email is definitively not recognized, then it is likely that a spammer forged the sender address on the bounced email, so delivery agent 119 simply ignores the bounceback, ensuring that the spam is never delivered.

If delivery agent 119 is not sure whether it was the source of the bounced email, then delivery agent 110 delivers the bounceback email to the email account, and lets the human owner of the account decide what to do.

If delivery agent 119 recognizes the bounced email as an email that was sent by webmail server 115, then at step 361, delivery agent automatically sends a reply bounceback. Thus, for valid emails, a human is never bothered with the bounceback authentication.

At step 362, delivery agent 119 checks whether the sub-address in the bounced email is a new sub-address, that is, a sub-address not known to the user's electronic address book, such as an Outlook address book. If the sub-address is known, processing is complete. If the sub-address is not known, at step 363, delivery agent 119 updates the user's electronic address book with the new sub-address.

In one embodiment, updating of the address book occurs as follows. Delivery agent 119 checks whether the email address without the sub-address exists in the user's address book. If so, then the email address with the sub-address is set as the primary email address and the email address without the sub-address is set as a secondary email address. On the other hand, if the email address without the sub-address is not found in the user's electronic address book, then an entry is created therefor.

In another embodiment, the email program is modified so that when a new email address with sub-address is automatically added to the address book by delivery agent 119, the email program automatically replaces an email address without sub-address with the corresponding email address with sub-address in a new email being sent.

Other embodiments will be apparent to those of ordinary skill in the art.

The order of steps 355 and 356 may be reversed.

Delivery agent 232 in FIG. 10D operates similarly to delivery agent 119.

Mail manager 226 in FIG. 10E includes the functionality shown at steps 355-362 of FIG. 11B.

Figure 11C:
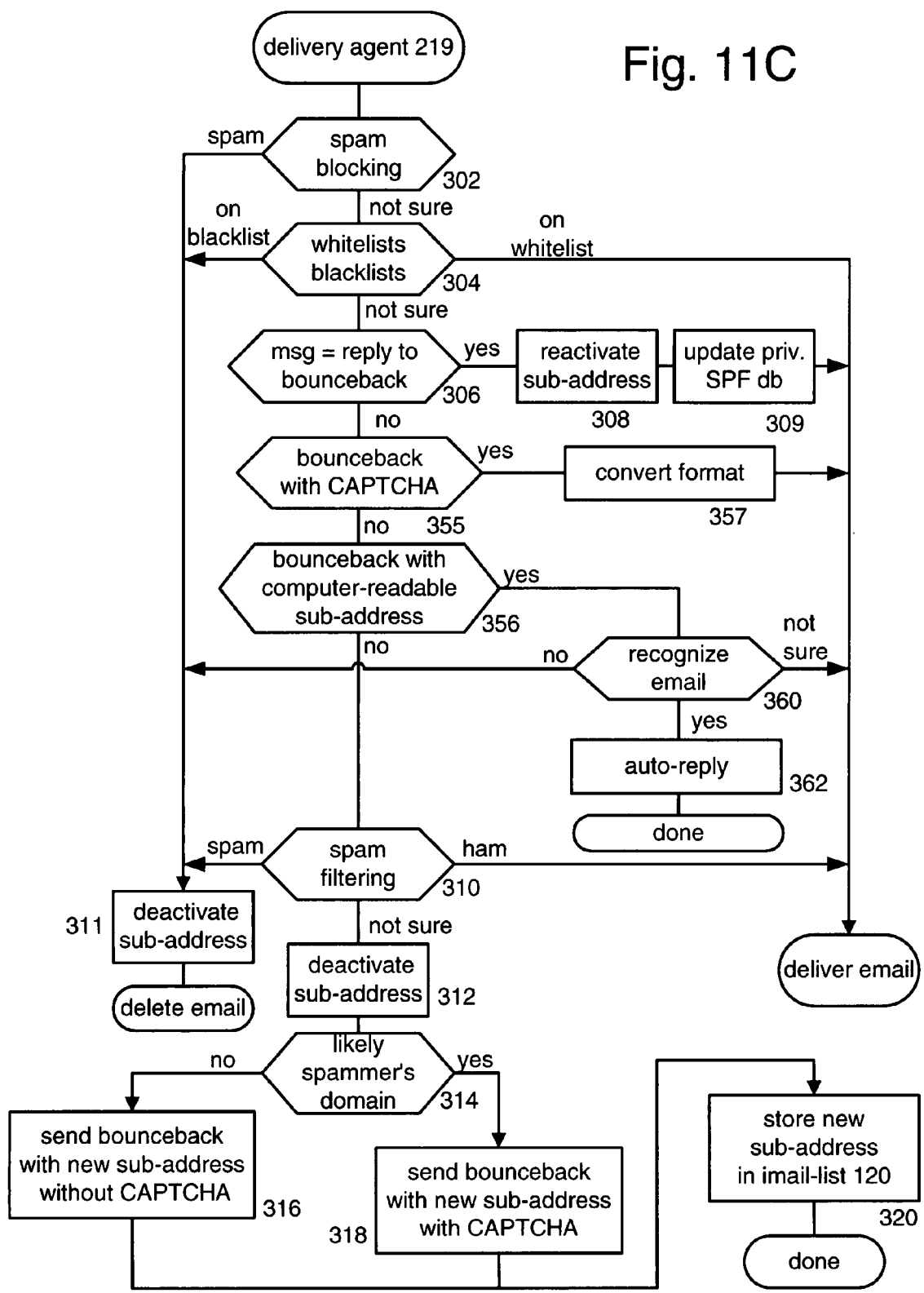

FIG. 11C shows the operation of mail delivery agent 219 in FIG. 10C. In short, mail delivery agent 219 has the capabilities of both delivery agent 132 and delivery agent 119, discussed above.

Figure 11D:
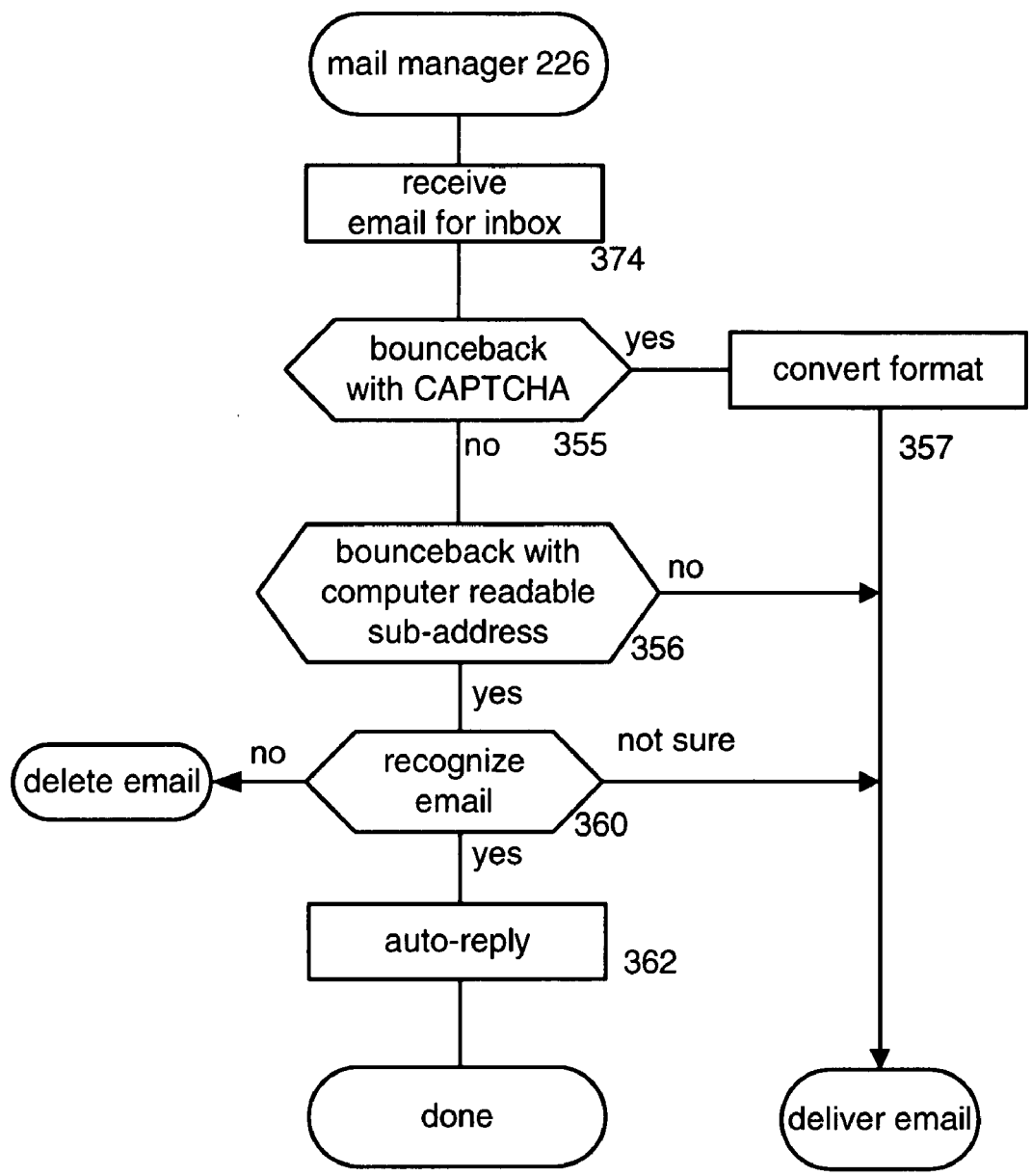

FIG. 11D shows the operation of mail manager 226 in FIG. 10E. In short, mail manager 226 is able to detect bouncebacks with computer readable sub-addresses and automatically reply thereto, without user intervention. Mail manager 226 may compare the TO: address of the original mail with the TO: addresses of messages it has recently sent to determine if an email is recognized at step 360.

In practice, if the email server for the mail manager is already implementing automatic bounceback reply, then there is no need for the mail manager to do so. However, in some embodiments, the email server will not implement automatic bounceback reply, and so the mail manager does so. This is particularly useful since there are a relatively small number of commercially used email clients, and one software provider's updating of all of its mail managers in its email clients will reach many end-users.

Figure 16:
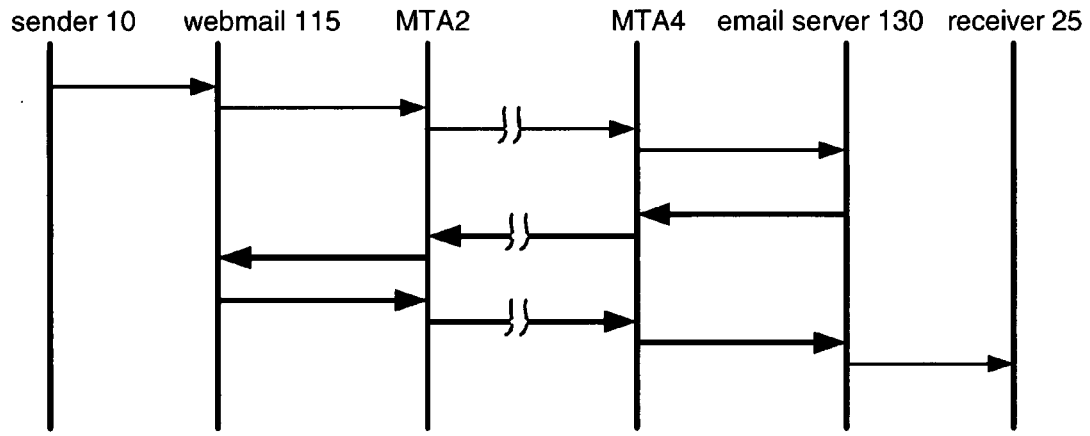
FIGS. 16-17 are inter-entity communication diagrams showing how a bounceback is sent according to the present invention.

FIG. 16 is an inter-entity communication diagram showing how a bounceback is automatically handled by delivery agent 119, in the case of a valid email message. That is, delivery agent 119 generates the reply bounceback without involvement from sender 10.

Figure 17:
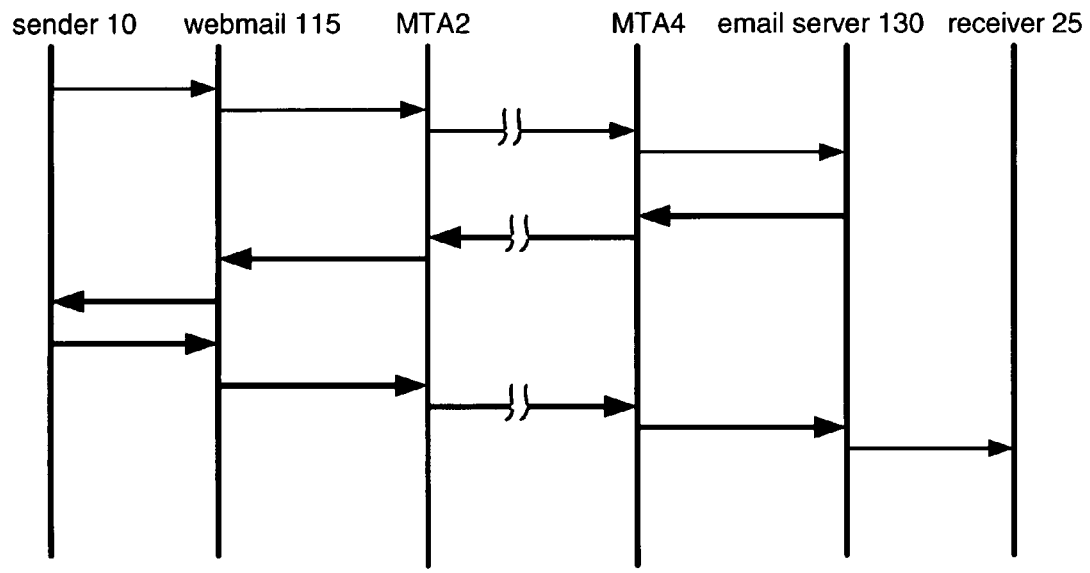

FIG. 17 is an inter-entity communication diagram showing how a bounceback requiring human intervention, such as a bounceback with sub-address encoded in CAPTCHA is delivered to a human who must create the reply bounceback.

Since email forwarder 40 only forwards emails to actual email accounts, it should never receive a bounceback, because the bounceback will be sent directly to the actual email account. If forwarder 40 has SRS, then it will received the bounceback and immediately forward it to the originally named sender.

A bounceback responsive to an email from virtual product provider 50 is sent to virtual product provider 50.

Differences between delivery agent 132 and the prior art are now briefly discussed.

Response to Possible Spam

When an incoming email without a sub-address arrives at a Zoemail system, it is believed that the Zoemail system sends a bounceback email to the original sender, with a hyperlink to a website. The sender goes to the website, proves they are a human, such as by solving a CAPTCHA, and provides the sender's email address. Zoemail's CAPTCHA is unrelated to a sub-address. The Zoemail system then sends a sub-address to the original sender. The original sender must now resend their original email but addressed to the sub-address provided by the Zoemail system.

When an incoming email without a sub-address arrives at a Reflexion system, it is believed that the Reflexion system sends a bounceback email to the original sender, including in the message field a sub-address. The original sender must resend their original email but addressed to the sub-address provided by the Reflexion system. A CAPTCHA is not used in any way.

When an incoming email without a sub-address arrives at delivery agent 132, delivery agent decides how trustworthy the email appears to be, and based on its decision, sends a bounceback email to the original sender with either a sub-address in the FROM field, or a CAPTCHA having an sub-address encoded therein. In the former case, the original sender need only reply. In the latter case, the original sender must extract the sub-address from the CAPTCHA and resend their original email addressed to the sub-address extracted from the CAPTCHA.

Automatic Deactivation of Sub-Addresses.

The Zoemail and Reflexion systems are believed to never automatically deactivate a sub-address.

In contrast, delivery agent 132 deactivates a sub-address when it is included in a suspected spam email, and reactivates the sub-address only when the email becomes trustworthy such as by being included in a reply to a bounceback email generated by delivery agent 132.

Private SPF Database

The Zoemail and Reflexion systems are believed to be unconcerned with any SPF database.

In contrast, delivery agent 132 is able to update a private SPF database, maintained by itself or a third party, and to use the private SPF database in spam filtering.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for authenticating a received email used by an email system, comprising:
   classifying the received email as either a first type or a second type based on whether the sender domain of the received email is associated with a spammer,
   when the received email is classified as the first type, sending a first type of bounceback email with a new sub-address to a sender of the received email, the first type of bounceback email having the new sub-address in computer-readable form, the new sub-address being appended to the origination email address in the bounceback email, and
   when the received email is classified as the second type, sending a second type of bounceback email to a sender of the received email, the second type of bounceback email having a test in a body of the second type of bounceback email, the test for differentiating a human from a machine and having a solution that is the new sub-address,
   wherein a destination address of a reply-to-bounceback email includes the new sub-address.

2. The method of claim 1, further comprising delivering the received email to its destination inbox after the sender of the received email is authenticated.

3. The method of claim 1, wherein the test is a CAPTCHA.

4. The method of claim 3, wherein the CAPTCHA presents the new sub-address.

5. The method of claim 1, wherein the received email includes an original sub-address and further comprising deactivating the original sub-address.

6. The method of claim 5, wherein the deactivating is performed by an executing software program.

7. The method of claim 5, further comprising receiving a subsequent email with the original sub-address, and performing spam filtering on the email while ignoring the now deactivated original sub-address, thereby increasing the likelihood that the deactivated email is classified as spam.

8. The method of claim 5, further comprising reactivating the original sub-address after determining that the sender of the received email is authentic.

9. The method of claim 8, wherein the reactivating is performed by an executing software program.

10. The method of claim 1, further comprising receiving the reply-to-bounceback email in reply to the bounceback email, and determining that the sender of the received email is authentic upon receipt of the reply-to-bounceback email.

11. The method of claim 10, wherein the bounceback email includes the message content of the received email.

12. The method of claim 1, wherein the new sub-address is in the FROM field of the bounceback email.

13. The method of claim 1, further comprising updating a private database with the authenticated sender information.

14. The method of claim 13, wherein the private database is local to a computer performing the authentication.

15. The method of claim 14, wherein the private database is centralized at a computer other than a computer performing the authentication.

16. The method of claim 1, further comprising
   receiving, at a computer associated with the sender of the received email, a bounceback email relating to an original email, the bounceback email having a new sub-address appended to the origination email address,
   checking, at the computer associated with the sender of the received email, whether the original email originated from the receiver of the bounceback email, and
   when the original email originated from the receiver of the bounceback email, replying, by the computer associated with the sender of the received email, to the bounceback email without human involvement.

17. The method of claim 16, further comprising determining whether the bounceback email includes a computer readable sub-address, and if so, then performing the checking.

18. The method of claim 17, further comprising determining whether the computer readable sub-address exists in an electronic address book, and if not, then updating the electronic address book to include the computer readable sub-address.

19. The method of claim 1, further comprising
   receiving, at a computer associated with the sender of the received email, a bounceback email relating to an original email, the bounceback email including a new sub-address generated by a sender of the bounceback email, the sub-address being in the body of the bounceback email encoded as a test requiring human participation,
   determining, at the computer associated with the sender of the received email, that the bounceback email includes a test requiring human participation to solve, the test involving the new sub-address,
   reformatting, at the computer associated with the sender of the received email, the bounceback email, and
   delivering, at the computer associated with the sender of the received email, the reformatted bounceback email to an inbox.

20. The method of claim 19, wherein the test is a CAPTCHA.

21. The method of claim 19, wherein the CAPTCHA presents the new sub-address.

22. The method of claim 19, wherein the reformatting includes providing a text entry field for the solution of the test, and an actuation element that, when actuated, sends the solution to a source of the bounceback email.

* * * * *